Dec. 31, 1968   J. B. GODSHALK   3,418,977
POULTRY WATERING DEVICES
Filed June 30, 1966
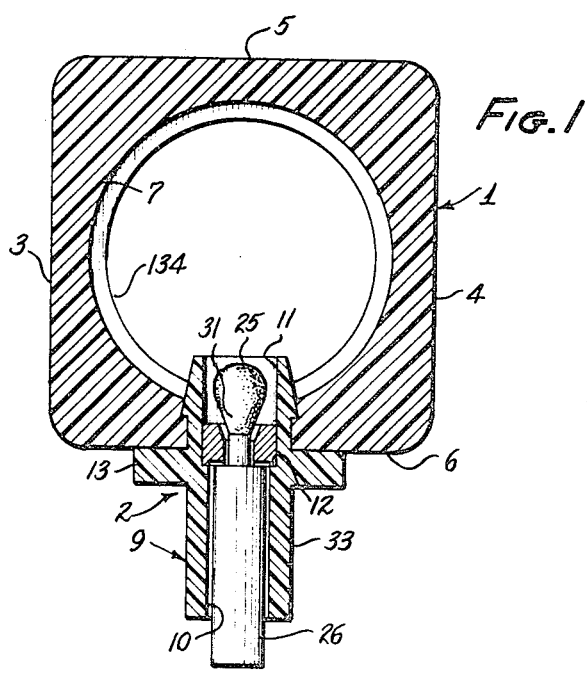
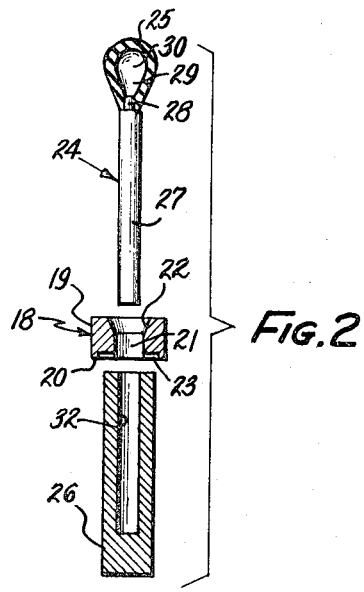
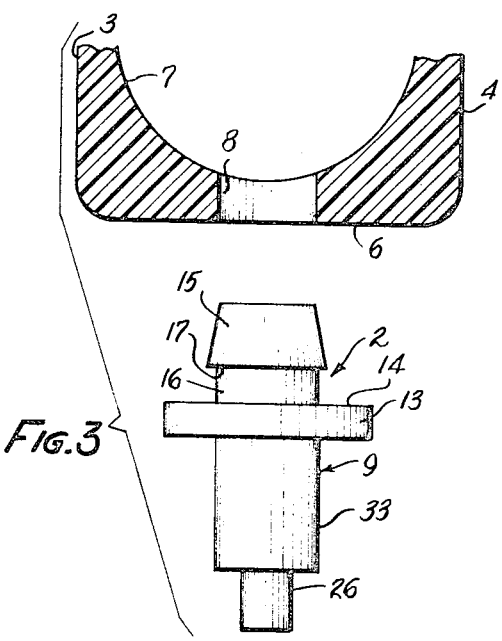
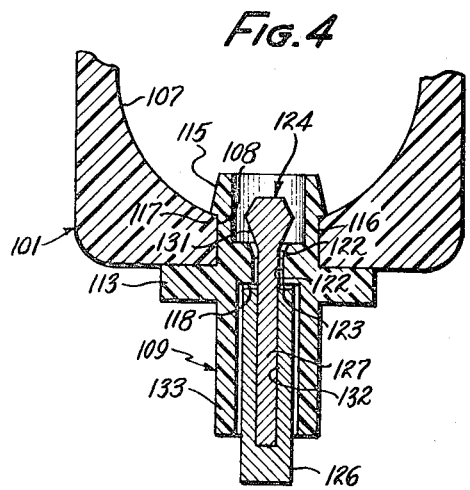
INVENTOR
JAMES B. GODSHALK
BY *Arnold & Roylance*
ATTORNEYS United States Patent Office 3,418,977
Patented Dec. 31, 1968

3,418,977
POULTRY WATERING DEVICES
James B. Godshalk, Yardley, Pa., assignor to Fox Products Company, Philadelphia, Pa., a corporation of Pennsylvania
Filed June 30, 1966, Ser. No. 561,899
6 Claims. (Cl. 119—72.5)

ABSTRACT OF THE DISCLOSURE

A poultry watering device which includes a generally rigid valve body member insertable through a port in a relatively resilient elongated conduit through which water can flow. The valve body includes an outwardly directed flange and shoulder portion which cooperate with the material of the conduit to maintain the valve body within the port. A through passage extends axially through the valve body and a generally frusto-conical valve seat is provided in the intermediate portion of the valve body. A movable valve unit is provided within the through passage, including an elongated valve stem and a valve element having a frusto-conical surface at substantially the same angle as the valve seat. The axial length of the valve element surface substantially exceeds the axial length of the valve seat to assure that said surface can readily and continuously engage against said seat to block water flow from the conduit through the through passage. A lower member or weight attaches to the valve stem to normally hold the valve element in closed position, and advantageously, the valve element surface is formed of an elastomeric material and the valve seat is formed of a generally rigid material, so that any particle which gets trapped therebetween will be more or less enveloped by the elastomeric material to prevent leakage between the valve seat and the valve element. When a fowl wishes to drink from the valve, it can readily push the lower member upwardly with its beak to unseat the valve element and thereby permit water flow from the conduit and through the through passage.

---

This invention relates to poultry watering devices and particularly to such devices of the type commonly referred to as nipple waterers, wherein the fowl engages a valve stem with its beak in order to cause drinking water to flow.

Though nipple type waterers have long been known and are widely used, the prior-art devices have presented numerous problems generally arising from the fact that the device must be sufficiently sensitive to allow the chicken or other fowl to use its beak to cause water to flow. One serious disadvantage of the prior art devices is that they are frequently made inoperative when small particles of dirt or foreign matter enter the area of the valve seat. Another disadvantage is that, even when the hydrostatic head at the input of the device is limited to from several inches to two or three feet, the force which must be applied by the fowl's beak to cause water to flow is too great.

It is a general object of the invention to devise a poultry waterer of the nipple type which will be more fully satisfactory in use than has been true with prior-art devices.

Another object is to provide such a device which is not sensitive to presence of foreign particles in the water.

A further object is to provide such a device which can be used with an input hydrostatic head of as much as six feet, yet requires forces on the order of only ¼ oz. to cause water to flow to the drinking fowl.

Yet another object is to provide such a device in which a number of nipple valve units are spaced along a water supply pipe and removably secured thereto in an improved fashion.

In order that the manner in which the foregoing and other objects are achieved in accordance with the invention can be understood in detail, particularly advantageous embodiments thereof will be described with reference to the accompanying drawings, which form a part of this specification, and wherein:

FIG. 1 is a vertical sectional view, with some parts shown in elevation, of a watering device in accordance with the invention;

FIG. 2 is an exploded view of a valve assembly forming part of the watering device of FIG. 1;

FIG. 3 is an exploded view illustrating the manner in which the watering device of FIG. 1 is assembled; and FIG. 4 is a vertical sectional view of a watering device constructed in accordance with another embodiment of the invention.

Referring now to the drawings in detail, and first to FIGS. 1-3, the poultry waterer here illustrated comprises a water supply conduit 1 and a plurality of valve units, one of which is indicated generally at 2, each valve unit being carried by conduit 1 and being operable to control water flow therefrom.

Conduit 1 is of considerable length and consists of one integral section of extruded synthetic resin material, or of a number of such sections joined end-to-end as hereinafter described. The transverse cross section of the conduit presents an outer periphery in the form of a square with rounded corners, so that, assuming that the conduit extends horizontally, it can be considered as having flat side surfaces 3 and 4, a flat top surface 5, and a flat bottom surface 6. The inner surface 7 of the conduit is a right cylindrical surface. At points spaced longitudinally along the conduit, cylindrical ports 8, FIG. 3, are provided. Each port 8 extends at right angles to bottom surface 6, opening through that surface and communicating with the interior of the conduit.

Conduit 1 is advantageously extruded from material combining good mechanical strength with limited but significant flexibility. Thus, particularly good results are obtained with polyethylene, or polyethylene copolymers, having a flex modulus of 7,500–25,000 p.s.i. at 23° C. as determined by American Society for Testing Materials Standard Method D1708.

The valve units 2 each comrise a body member 9 made as an integral piece from an essentially rigid synthetic resin material, typically rigid polyvinyl chloride. Body 9 has a cylindrical axial bore including a lower portion 10 of smaller diameter, and an upper portion 11 of larger diameter, the two bore portions being joined by a transverse annular upwardly directed shoulder 12. Body 9 includes an outwardly projecting transverse annular flange 13 presenting a flat annular face 14, FIG. 3, directed toward the upper end of the body and lying at right angles thereto. Upper tip portion 15 of body 9 is frusto-conical, tapering inwardly and away from flange 13. Between tip portion 15 and flange 13, the outer surface portion 16 of body 9 is cylindrical and of smaller diameter than is the base of the frusto-conical tip portion 15, so that a transverse annular shoulder 17, FIG. 3, is provided at the junction between tip portion 15 and surface portion 16 and faces flange 13.

The diameter of outer surface portion 16 of body 9 is substantially equal to or slightly larger than the diameter of port 8. Hence, the outer periphery of shoulder 17 is of substantially larger diameter than is port 8. The valve unit 2 is secured to conduit 1 by forcing body 9 into port 8, tip portion first. The length of surface portion 16 is substantially less than the length of port 8, and the base of tip portion 15 and shoulder 17 of body 9 are thus embedded in the wall of conduit 1 when face 14 of flange 13 is in flush engagement with bottom surface 6 of the conduit. Due to the flexibility of the material from which conduit 1 is extruded, the distorted portion of the wall of port 8 very tightly embraces the tip portion 15 near the base thereof, locking the valve body securely to the conduit and maintaining tight face-to-face contact between surface 6 of the conduit and face 14 of flange 13. The relatively undistorted portion of the wall of port 8 also snugly embraces surface portion 16 of the valve body. In all, the relation just described between the valve body 9 and the conduit 1 assures a joint between the conduit and the valve body which is fluid-tight at the operating pressures of the waterer, so that no leakage of water occurs at the outer surface of the valve body. On the other hand, the valve unit is easily removable from the conduit, and a new valve unit can thus be installed quickly and simply. Both the sealed fluid-tight relation between the valve body and the conduit and the ease of insertion and removal of the valve body result from the particular configuration of the valve body and the rigidity of the valve body and limited flexibility of the conduit.

Valve body 9 carries a stationary valve seat member 18, advantageously of stainless steel in this embodiment of the invention. Member 18 has a cylindrical outer surface 19, FIG. 2, snugly embraced by the wall of bore portion 11 when the seat member is installed, as seen in FIG. 1, with the flat bottom surface 20 thereof engaged with shoulder 12. The seat member has an axial through passage comprising a cylindrical lower bore portion 21 and an upwardly and outwardly flaring frusto-conical valve seat 22, FIG. 2. Bottom surface 20 of member 18 is interrupted by two radial grooves 23 which open inwardly into communication with bore portion 21 but terminate short of outer surface 19.

The valve unit 2 includes a movable valve assembly comprising a stainless steel valve stem 24, a resilient valve element 25, and a dependent cylindrical member 26 which constitutes both a weight and a means by which a fowl can open the valve. Stem 24 includes a straight cylindrical main portion 27 of smaller diameter than bore portion 21 of seat member 18. At its upper end, stem 24 has a short axially projecting portion 28, FIG. 2, of smaller diameter than main portion 27. Portion 28 terminates in a bulbous tip comprising a frusto-conical portion 29, which tapers downwardly and inwardly to join portion 28, and a hemispherical portion 30. Frusto-conical portion 29 tapers at at least essentially the same angle as does the valve seat 22.

The resilient valve element 25 is of elastomeric material, such as butyl rubber, having a durometer of 35–90, with particularly advantageous results obtained when the elastomeric material has a durometer of 40–70. Element 25 is in the nature of a sheath molded directly on portions 28, 29 and 30 of the valve stem in such fashion that the sheath is of uniform thickness and presents a downwardly and inwardly tapering frusto-conical lower surface portion 31, FIG. 1, which tapers at essentially the same angle (when the elastomeric material of element 25 is relaxed) as does seat 22. The axial extent of seat 22 is relatively long, and the axial extent of the lower surface portion 31 of valve element 25 is markedly longer than that of seat 22.

The combination of elements 18, 24 and 26 is assembled prior to insertion of the seat member into the valve body. Valve element 25 having first been molded in place, portion 27 of the valve stem is inserted through the central passage of seat member 18, the latter being so positioned that seat 22 faces element 25. Member 26 has an axial bore 32, FIG. 2, which opens through the upper end of the member and is closed at its lower end. Stem portion 27 is inserted fully into bore 32, and member 26 is then rigidly secured to the valve stem in any suitable fashion, as by staking. Bore 32 is substantially shorter than stem portion 27. Hence, with the valve unit fully assembled as seen in FIG. 2, surface 31 of valve element 25 is spaced above seat 22 when the flat transverse upper end surface of member 26 engages bottom surface 20 of seat member 28.

With the movable elements of the valve so positioned, the valve is open for flow of water from the interior of conduit 1 downwardly about element 25, through the annular space between stem portion 27 and the wall of the passage through member 18, outwardly through grooves 23, and thence downwardly via the annular space between member 26 and bore portion 10 of body 9.

Dependent cylindrical portion 33 of body 9 is sufficiently shorter than member 26 that, with the valve in the fully open position of FIG. 1, the lower end portion of member 26 still projects well below the lower end of body portion 33. With no upward pressure applied to member 26, the movable elements of the valve can descend by gravity until surface 31 of element 25 engages seat 22, the lower end portion of member 26 then projecting still further below the lower end of the valve body, as seen in FIG. 3, so that a fowl wishing to drink from the valve can easily engage its beak with the tip of member 26 and force that member upwardly until the valve is in the open position seen in FIG. 1.

With conduit 1 connected to a source of water (not shown), and assuming no upward force is applied to member 26, the moveable elements of the valve are urged downwardly to closed position by both the hydrostatic head applied by the water and the combined weight of elements 24, 25 and 26. Since the valve must open freely when only the small force applied by the fowl's beak acts on member 26, the sum of the hydrostatic and gravitational forces tending normally to close the valve must be small. Thus, typical valves constructed as described with reference to FIGS. 1–3 require less than 7 grams of upward force to open the valve. Further, satisfactorily low opening force requirements are maintained even when the hydrostatic head applied by the water is as much as 6 feet, a value which is about twice that usually encountered in nipple valve waterers heretofore available to the trade.

In this embodiment, the combination of rigid seat 22, softness of valve element 25, and the relatively sharply tapered configuration of the seat affords virtual freedom from leakage which might otherwise occur because of presence of dirt particles on the seat or on surface 31. Since the seat and surface 31 taper at at least essentially the same angle, any particle present between the seat and surface 31 is simply enveloped by the relatively soft material of element 25, and a complete seal is provided about the particle.

FIG. 4 illustrates a second embodiment of the invention employing the same conduit 1 described with reference to FIGS. 1 and 3. In this embodiment, valve body 109 and seat 122 are formed as an integral piece of nylon characterized by both significant elasticity and a significant tendency to soften upon prolonged exposure to water. The outer configuration of body 109 is generally the same as that of body 9, FIGS. 1 and 3, save that the portion 116 is as long as the longest axial dimension of port 8 so that shoulder 117 engages the inner surface 107 of conduit 101 after the frusto-conical tip portion 115 has been forced through the port 108, conduit 101 being of the same material hereinbefore described for conduit 1, FIG. 1.

Movable valve member 124 is an integral stainless steel piece, including stem portion 127 and a portion presenting valve surface 131, surface 131 being frusto-conical and tapering inwardly toward the stem portion at the same angle as does the frusto-conical seat 122. Member 126 is similar to member 26, FIG. 2, receiving stem portion 127 and being rigidly secured thereto. The upper end face of member 126 is flat and extends at right angles to the longitudinal axis of member 126 and, therefore, parallel to shoulder 118 of body 109 when the valve is assembled as shown in FIG. 4. Radial grooves 123 are formed in the upper end face of member 126 and extend from bore 132 through the outer cylindrical surface of member 126 so as to allow water to flow from through passage 121 through grooves 123 and downwardly through the annular space between member 126 and portion 133 of the body 109 when the upper end face of member 126 engages shoulder 118.

Both in the embodiment shown in FIG. 1 and in that shown in FIG. 4, the frusto-conical surfaces of the valve seat and the movable valve element taper downwardly and inwardly at an acute angle relative to the central axis of the valve body. This angle can be in the range of 20–35°, and superior results are achieved when the angle is on the order of 22½°. It is important that the valve seat and the frusto-conical surface of the movable valve element be relatively long, with the latter being substantially longer than the valve seat, and that either the movable valve element or the seat have significant deformability under the conditions of use, the other of such elements being essentially rigid.

The cross-sectional shape of conduit 1 and conduit 101 has the advantage of presenting a flat bottom surface which can be engaged face-to-face by the flange 13, 113 of the valve body, while retaining the circular cross section of the internal wall of the conduit so that sections of the conduit can be joined end-to-end by the simple expedient of inserting a cylindrical sleeve 134, FIG. 1, in the adjacent ends of the two sections to be coupled.

What is claimed is:

1. A poultry watering device comprising:
   an elongated conduit adapted for generally horizontal installation and having a bottom surface, a generally cylindrical inner wall, and a port opening between said flat bottom surface and said inner wall;
   a valve body means having an upper inlet portion, a lower outlet portion, and an intermediate portion between said upper and lower portions, and a through passage extending therethrough,
      said intermediate portion including an angularly tapering surface forming a valve seat,
      said valve body means comprising an integral member;
      said upper inlet portion having an upwardly and inwardly tapering frusto-conical outer surface;
      said intermediate portion including an outwardly projecting flange;
      said valve body member including a reduced diameter portion extending between said flange and the lower end of said frusto-conical outer surface, thereby forming a transversely directed shoulder joining the lower end of said frusto-conical outer surface with the upper end of said reduced diameter portion;
   said valve body member being disposed in said port with said flange engaging said bottom surface, said upper inlet portion projecting at least partially beyond said inner wall and into said conduit, and said transversely directed shoulder engaging the material of said conduit to maintain said flange in engagement with said bottom surface, the wall of said port embracing said reduced diameter portion of said valve body member;
   a movable valve unit coaxially aligned with said valve body means along an axis, comprising
      an elongated stem extending through said through passage and having a transverse cross-sectional dimension smaller than that of said through passage passing through said intermediate portion;
      a movable valve element carried by said stem at the upper end thereof and including an angularly tapering surface at substantially the same angle as said valve seat surface;
      said valve element surface having an axial length which substantially exceeds the axial length of said valve seat; and
      an elongated lower member rigidly secured to said stem and extending through said outlet portion, said lower member being substantially longer than said outlet portion and having a transverse cross-sectional dimension substantially larger than that of said intermediate through passage portion but smaller than that of said lower through passage portion;
   said movable valve unit being freely movable axially of said valve body means between a lower position in which said valve element surface engages said valve seat to close said through passage against water flow, and an upper position, in which said valve element surface is spaced away from said valve seat to allow water to flow through said through passage;
   said valve element surface and said valve seat being formed of diverse materials, one of which is relatively rigid and the other of which is relatively yieldable, so that when said valve unit is closed and said valve element surface is engaged against said valve seat, the combined force from the weight of said valve stem and said lower member and the pressure of said water upon said valve element enables said relatively yieldable material to deform around any particle trapped between said surface and said valve seat to assure that said through passage will be closed against water flow, even if a particle is present at said valve unit.

2. A poultry watering device according to claim 1 wherein
   said valve body means is an integral piece of synthetic resin material, and
   said movable valve element is integral with said stem.

3. A poultry watering device according to claim 1, wherein
   said conduit is of synthetic resin material having a flex modulus of 7,500–25,000 p.s.i. at 23° C., and said valve body member is of essentially rigid material.

4. A poultry watering device according to claim 1, wherein
   the distance between said flange and said outer shoulder is approximately equal to the longest axial dimension of said port and the wall of said conduit is clamped between said flange and said outer shoulder.

5. A poultry watering device according to claim 1 wherein said transversely directed shoulder is located within said port between said cylindrical inner wall and said bottom surface and is hence embedded in the wall of said port.

6. A poultry watering device according to claim 1 wherein at least a substantial portion of said outer surface of said upper inlet portion of said valve body means projects beyond said cylindrical inner wall of said conduit.

References Cited

UNITED STATES PATENTS

| | | | |
|---|---|---|---|
| 2,457,159 | 12/1948 | Kofford | 119—72.5 |
| 2,486,729 | 11/1949 | Beckley | 119—72.5 |
| 2,541,369 | 2/1951 | Kofford | 119—72.5 |
| 3,008,451 | 11/1961 | Curry | 119—72.5 |
| 3,215,119 | 11/1965 | Graham | 119—75 |

HUGH R. CHAMBLEE, *Primary Examiner.*

U.S. Cl. X.R.

119—75